United States Patent
Young (10) Patent No.: US 8,202,645 B2
(45) Date of Patent: Jun. 19, 2012

(54) BATTERY CELL ASSEMBLY AND METHOD FOR ASSEMBLING THE BATTERY CELL ASSEMBLY

(75) Inventor: Heekook Young, Troy, MI (US)

(73) Assignee: LG Chem, Ltd., Seoul (KR)

( * ) Notice: Subject to any disclaimer, the term of this patent is extended or adjusted under 35 U.S.C. 154(b) by 746 days.

(21) Appl. No.: 12/246,073

(22) Filed: Oct. 6, 2008

(65) Prior Publication Data

US 2010/0086842 A1    Apr. 8, 2010

(51) Int. Cl.
*H01M 2/08* (2006.01)
(52) U.S. Cl. .................... 429/163; 429/185; 429/151
(58) Field of Classification Search .................. 429/163, 429/185, 151
See application file for complete search history.

(56) References Cited

U.S. PATENT DOCUMENTS

| | | |
|---|---|---|
| 4,390,841 A | 6/1983 | Martin et al. |
| 5,606,242 A | 2/1997 | Hull et al. |
| 5,652,502 A | 7/1997 | Van Phuoc et al. |
| 5,658,682 A | 8/1997 | Usuda et al. |
| 5,796,239 A | 8/1998 | Van Phuoc et al. |
| 5,825,155 A | 10/1998 | Ito et al. |
| 5,982,403 A | 11/1999 | Inagaki |
| 6,016,047 A | 1/2000 | Notten et al. |
| 6,353,815 B1 | 3/2002 | Vilim et al. |
| 6,362,598 B2 | 3/2002 | Laig-Horstebrock et al. |
| 6,441,586 B1 | 8/2002 | Tate, Jr. et al. |
| 6,515,454 B2 | 2/2003 | Schoch |
| 6,534,954 B1 | 3/2003 | Plett |
| 6,563,318 B2 | 5/2003 | Kawakami et al. |
| 6,724,172 B2 | 4/2004 | Koo |
| 6,821,671 B2 | 11/2004 | Hinton et al. |
| 6,829,562 B2 | 12/2004 | Sarfert |
| 6,832,171 B2 | 12/2004 | Barsoukov et al. |
| 6,876,175 B2 | 4/2005 | Schoch |
| 6,892,148 B2 | 5/2005 | Barsoukov et al. |
| 6,927,554 B2 | 8/2005 | Tate, Jr. et al. |
| 6,943,528 B2 | 9/2005 | Scoch |
| 6,967,466 B2 | 11/2005 | Koch |
| 7,012,434 B2 | 3/2006 | Koch |
| 7,039,534 B1 | 5/2006 | Ryno et al. |
| 7,061,246 B2 | 6/2006 | Dougherty et al. |
| 7,072,871 B1 | 7/2006 | Tinnemeyer |

(Continued)

FOREIGN PATENT DOCUMENTS

KR    10-0905393 B1    6/2009

(Continued)

OTHER PUBLICATIONS

U.S. Appl. No. 11/828,927, filed Jul. 26, 2007 entitled Battery Cell Carrier Assembly Having a Battery Cell Carrier for Holding a Battery Cell Therein.

(Continued)

*Primary Examiner* — Jane Rhee
(74) *Attorney, Agent, or Firm* — Buckert Patent & Trademark Law Firm, P.C.; John F. Buckert (57) ABSTRACT

A battery cell assembly and a method for assembling the battery cell assembly are provided. The battery cell assembly includes first and second rectangular ring-shaped panel members and at least one battery cell. The first and second rectangular ring-shaped panel members are configured to easily couple together to hold the battery cell therebetween.

5 Claims, 8 Drawing Sheets

U.S. PATENT DOCUMENTS

| | | | |
|---|---|---|---|
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,197,487 B2 | 3/2007 | Hansen et al. | |
| 7,199,557 B2 | 4/2007 | Anbuky et al. | |
| 7,250,741 B2 | 7/2007 | Koo et al. | |
| 7,253,587 B2 | 8/2007 | Meissner | |
| 7,315,789 B2 | 1/2008 | Plett | |
| 7,321,220 B2 | 1/2008 | Plett | |
| 7,327,147 B2 | 2/2008 | Koch | |
| 7,976,980 B2 | 7/2011 | Yoon et al. | |
| 2003/0184307 A1 | 10/2003 | Kozlowski et al. | |
| 2005/0100786 A1 | 5/2005 | Ryu et al. | |
| 2005/0127874 A1 | 6/2005 | Lim et al. | |
| 2005/0194936 A1 | 9/2005 | Cho | |
| 2006/0097698 A1 | 5/2006 | Plett | |
| 2006/0100833 A1 | 5/2006 | Plett | |
| 2006/0111854 A1 | 5/2006 | Plett | |
| 2006/0111870 A1 | 5/2006 | Plett | |
| 2006/0234119 A1* | 10/2006 | Kruger et al. | 429/160 |
| 2007/0035307 A1 | 2/2007 | Scoch | |
| 2007/0046292 A1 | 3/2007 | Plett | |
| 2007/0103120 A1 | 5/2007 | Plett | |
| 2007/0120533 A1 | 5/2007 | Plett | |
| 2007/0141457 A1 | 6/2007 | Amagai | |
| 2007/0188143 A1 | 8/2007 | Plett | |
| 2007/0236182 A1 | 10/2007 | Plett | |
| 2008/0094035 A1 | 4/2008 | Plett | |

FOREIGN PATENT DOCUMENTS

| | | |
|---|---|---|
| KR | 10-0921346 A | 10/2009 |

OTHER PUBLICATIONS

U.S. Appl. No. 12/016,630, filed Jan. 18, 2008 entitled Battery Cell Assembly and Method for Assembling the Battery Cell Assembly.

U.S. Appl. No. 12/165,100, filed Jun. 30, 2008 entitled Battery Cell Assembly Having Heat Exchange with Serpentine Flow Path.

U.S. Appl. No. 12/164,741, filed Jun. 30, 2008 entitled Battery Module Having Battery Cell Assemblies with Alignment-Coupling Features.

U.S. Appl. No. 12/164,780, filed Jun. 30, 2008 entitled Battery Module Having Battery Cell Assembly with Heat Exchanger.

U.S. Appl. No. 12/164,627, filed Jun. 30, 2008 entitled Battery Module Having Cooling Manifold and Method for Cooling Battery Module.

U.S. Appl. No. 12/164,445, filed Jun. 30, 2008 entitled Battery Module Having a Rubber Cooling Manifold.

* cited by examiner

BATTERY CELL ASSEMBLY AND METHOD FOR ASSEMBLING THE BATTERY CELL ASSEMBLY

TECHNICAL FIELD

This application relates to a battery cell assembly and a method for assembling the battery cell assembly.

BACKGROUND OF THE INVENTION

Battery packs generally have a plurality of battery cells. However, designers have not developed a battery cell with a housing that allows battery cells to be easily enclosed therein.

Accordingly, the inventors herein have recognized a need for an improved battery cell assembly that minimizes and/or eliminates the above-mentioned deficiency.

SUMMARY OF THE INVENTION

A battery cell assembly in accordance with an exemplary embodiment is provided. The battery cell assembly includes a first rectangular ring-shaped panel member having first and second side walls, a first top wall, and a first bottom wall. The first and second side walls are substantially parallel to one another and are disposed between the first top wall and the first bottom wall. The first side wall has a first coupling member, and the second side wall has a first ledge portion. The battery cell assembly further includes a second rectangular ring-shaped panel member having third and fourth side walls, a second top wall, and a second bottom wall. The third and fourth side walls are substantially parallel to one another and are disposed between the second top wall and the second bottom wall. The third side wall has a second coupling member, and the fourth side wall has a second ledge portion. The first coupling member of the first side wall of the first rectangular ring-shaped panel member engages the second ledge portion of the fourth side wall of the second rectangular ring-shaped panel member, and the second coupling member of the third side wall of the second rectangular ring-shaped panel member engages the first ledge portion of the second side wall of the first rectangular ring-shaped panel member. The battery cell assembly further includes at least one battery cell fixedly held between the first and second rectangular ring-shaped panels.

A method for assembling a battery cell assembly in accordance with another exemplary embodiment is provided. The battery cell assembly has a first rectangular ring-shaped panel member with first and second side walls, a first top wall, and a first bottom wall. The first and second side walls are substantially parallel to one another and are disposed between the first top wall and the first bottom wall. The first side wall has a first coupling member, and the second side wall has a first ledge portion. The battery cell assembly further includes a second rectangular ring-shaped panel member with third and fourth side walls, a second top wall, and a second bottom wall. The third and fourth side walls are substantially parallel to one another and are disposed between the second top wall and the second bottom wall. The third side wall has a second coupling member, and the fourth side wall has a second ledge portion. The method includes disposing at least one battery cell between the first and second rectangular ring-shaped panel members. The method further includes engaging the first coupling member of the first side wall of the first rectangular ring-shaped panel member to the second ledge portion of the fourth side wall of the second rectangular ring-shaped panel member. The method further includes engaging the second coupling member of the third side wall of the second rectangular ring-shaped panel member to the first ledge portion of the second side wall of the first rectangular ring-shaped panel member, such that the at least one battery cell is fixedly held between the first and second rectangular ring-shaped panel members.

DETAILED DESCRIPTION OF AN EXEMPLARY EMBODIMENT

Figure 1:
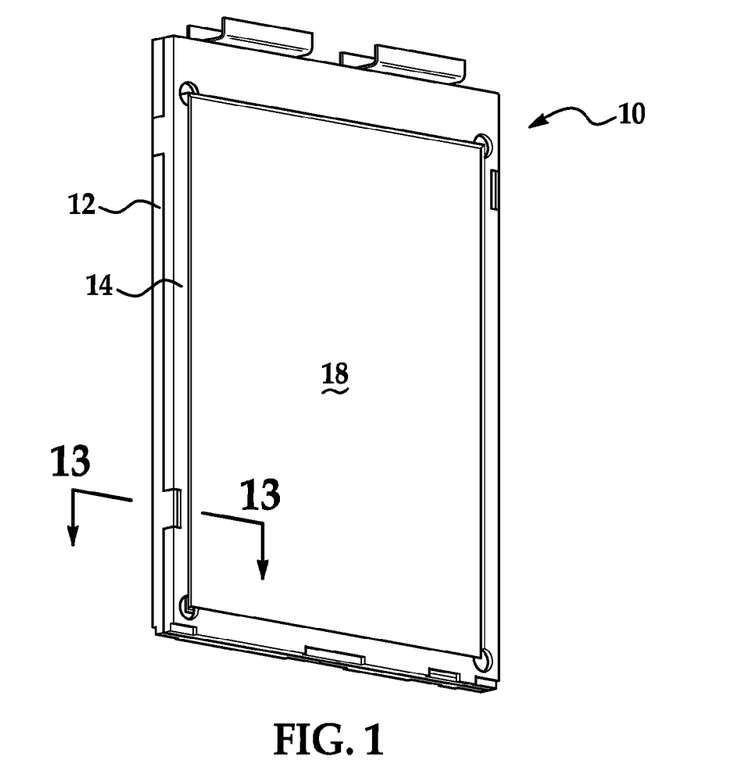
FIG. 1 is a schematic of a battery cell assembly in accordance with an exemplary embodiment.
Figure 13:
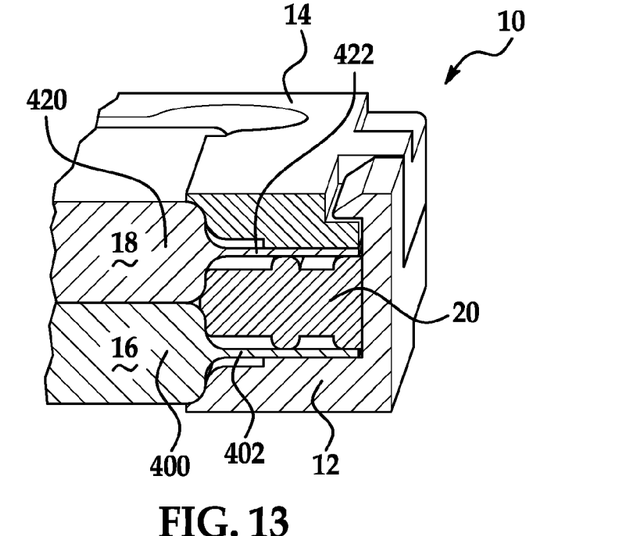
FIG. 13 is a cross-sectional schematic of a portion of the battery cell assembly of FIG. 1.

Referring to FIGS. 1 and 13, a battery cell assembly 10 for outputting a voltage in accordance with an exemplary embodiment is illustrated. The battery cell assembly 10 includes rectangular ring-shaped panel members 12, 14, battery cells 16, 18, and a gasket 20. It should be noted that in alternative embodiments, the battery cell assembly 10 could hold only one battery cell or two or more battery cells therein.

The rectangular ring-shaped panel members 12, 14 are provided to hold the battery cells 16, 18 therebetween and to be coupled together.

Figure 2:
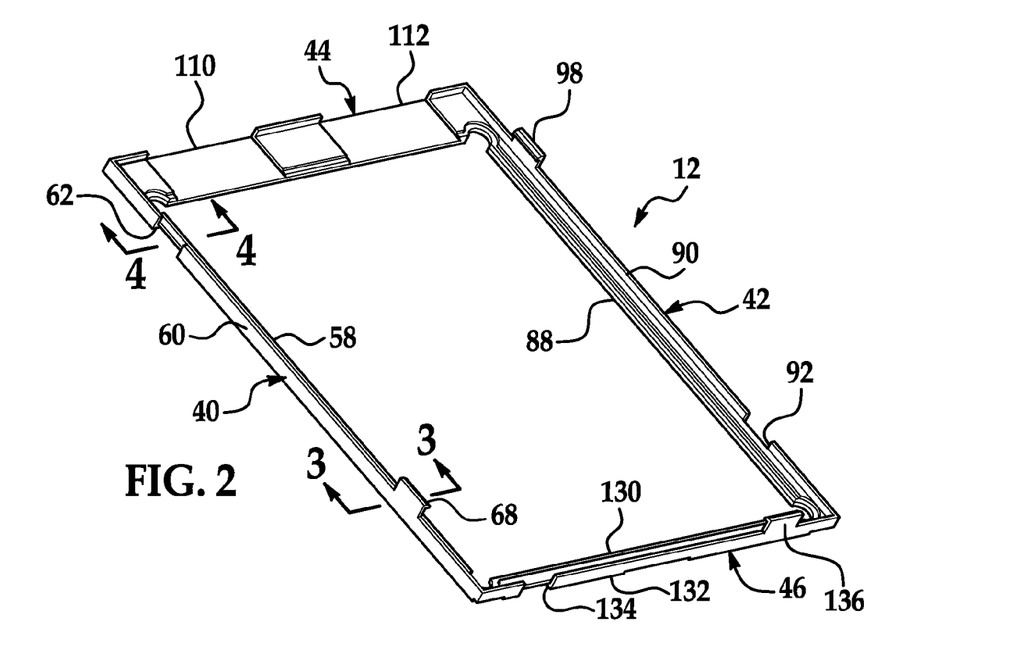
FIG. 2 is a schematic of a first rectangular ring-shaped panel member utilized in the battery cell assembly of FIG. 1.
Figure 3:
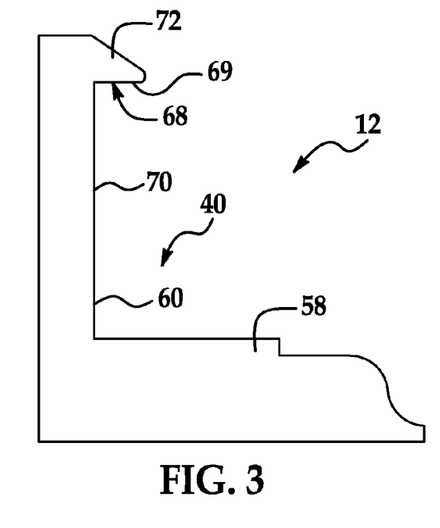
FIG. 3 is a cross-sectional schematic of a portion of the first rectangular ring-shaped panel member of FIG. 2.

Referring to FIGS. 2 and 13, the rectangular ring-shaped panel member 12 is provided to support the battery cell 16 thereon. The rectangular ring-shaped panel member 12 includes side walls 40, 42, a top wall 44, and a bottom wall 46. In one exemplary embodiment, the rectangular ring-shaped panel member 12 is constructed from plastic. Of course other materials such as ceramics for example are contemplated. The side walls 40, 42 are disposed substantially parallel to one another and are disposed a predetermined distance apart from one another. Further, the side walls 40, 42 are disposed between the top wall 44 and the bottom wall 46.

Referring to FIGS. 2-8, the side wall 40 includes a plate portion 58, a riser portion 60 and a coupling member 68. The riser portion 60 is coupled to the plate portion 58 and extends outwardly from the plate portion 58. The coupling member 68 is coupled to the riser portion 60 and extends in the same direction as the riser portion 60 away from the plate portion 58. The coupling member 68 is configured to engage a ledge portion 294 (shown in FIGS. 9 and 11) of the panel member 14 to hold the panel members 12, 14 together. The coupling member 68 includes an extension portion 70 that extends from the riser portion 60, and a head portion 68 that is coupled to an end of the extension portion 70. In particular, a surface 69 of the head portion 68 engages a surface of the ledge portion 294 of the panel member 14.

Figure 4:
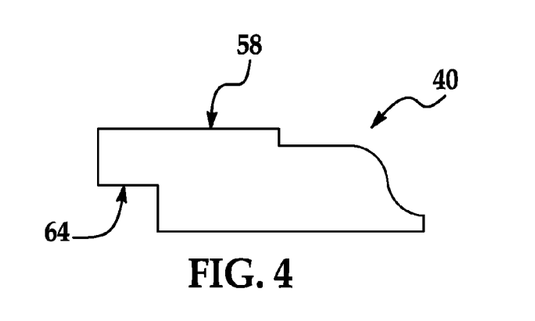
FIG. 4 is a cross-sectional schematic of another portion of the first rectangular ring-shaped panel member of FIG. 2.
Figure 5:
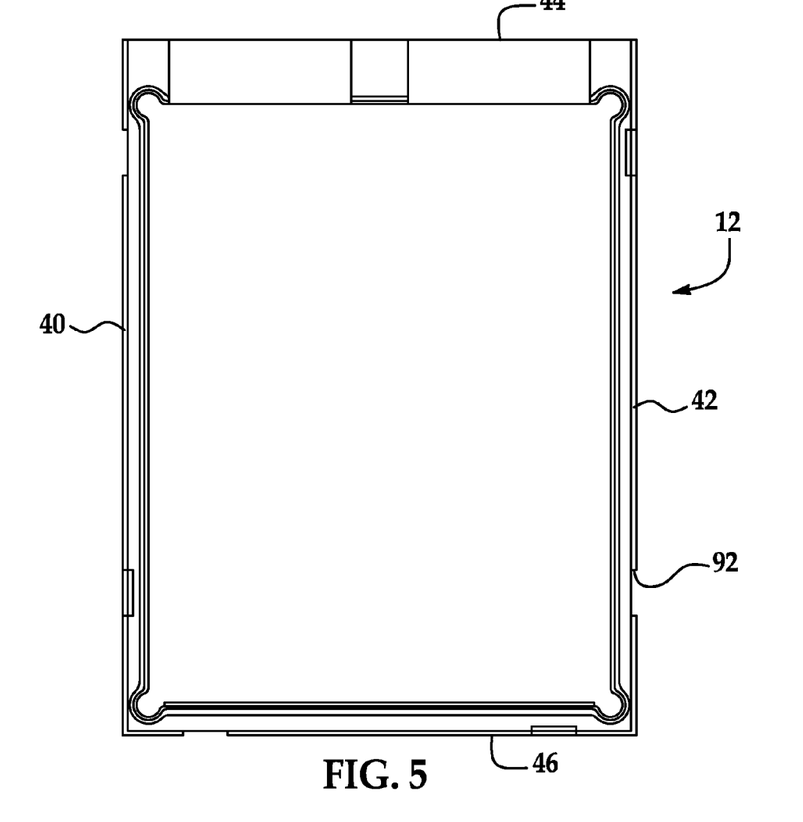
FIG. 5 is a schematic of a first side of the first rectangular ring-shaped panel member of FIG. 2.
Figure 6:
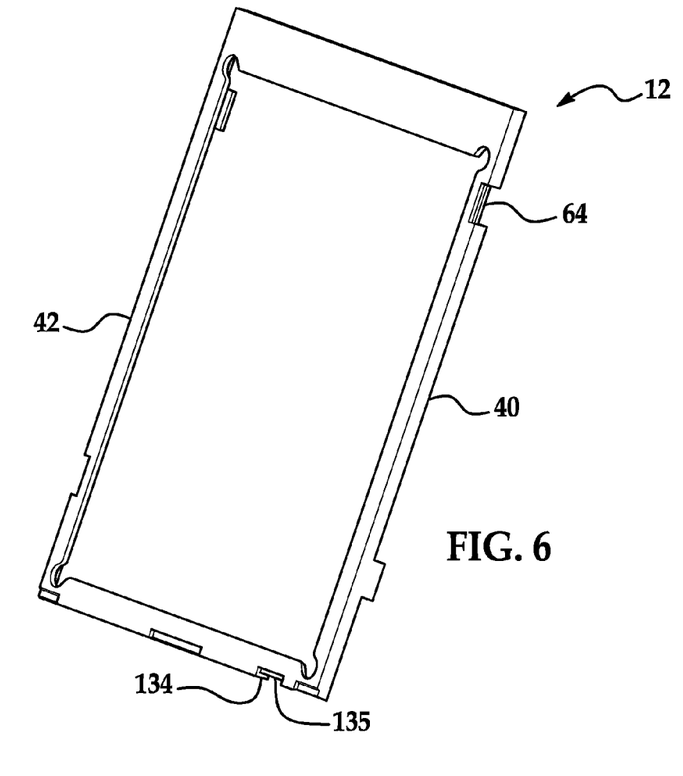
FIG. 6 is another schematic of the first rectangular ring-shaped panel member of FIG. 2.

Referring to FIGS. 2 and 4, the side wall 40 further includes a groove 62 extending therein that defines a ledge portion 64. The ledge portion 64 is configured to engage a coupling member 298 of the side wall 242 of the panel member 14 to hold the panel members 12, 14 together.

Referring to FIG. 2, the side wall 42 includes a plate portion 88, a riser portion 90 and a coupling member 98. The riser portion 90 is coupled to the plate portion 88 and extends outwardly from the plate portion 88. The coupling member 98 is coupled to the riser portion 90 and extends in the same direction as the riser portion 90 away from the plate portion 98. The coupling member 98 is configured to engage a ledge portion 264 (shown in FIGS. 9 and 10) of the panel member 14 to hold the panel members 12, 14 together. The coupling member 98 has a substantially similar configuration as coupling member 68.

Figure 7:
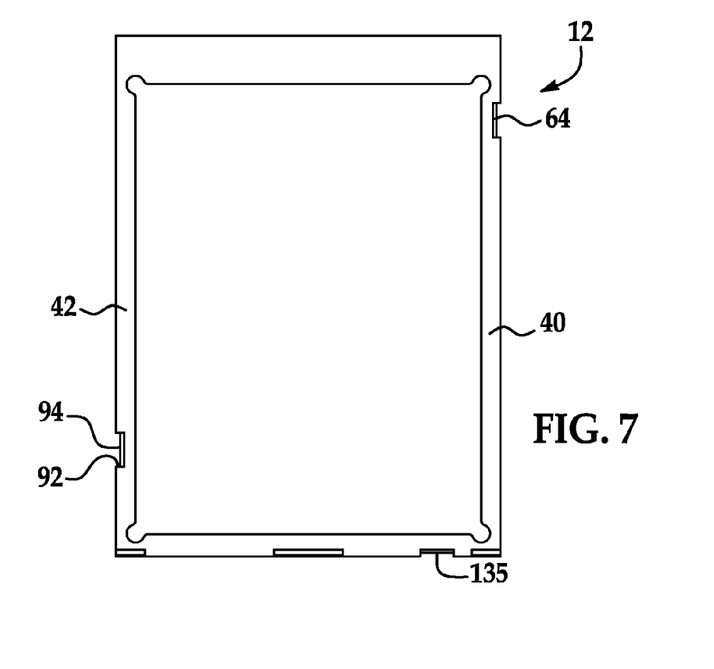
FIG. 7 is a schematic of a second side of the first rectangular ring-shaped panel member of FIG. 2.
Figure 8:
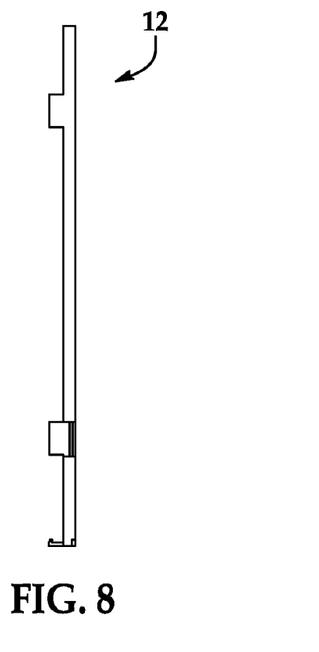
FIG. 8 is a schematic of a side of the first rectangular ring-shaped panel member of FIG. 2.

Referring to FIGS. 2 and 7, the side wall 42 further includes a groove 92 extending therein that defines a ledge portion 94. The ledge portion 94 is configured to engage a coupling member 268 (shown in FIG. 9) of the side wall 240 of the panel member 14 to hold the panel members 12, 14 together.

Referring to FIG. 2, the top wall 44 extends between the side walls 40, 42 at a first end of the panel member 12. The top wall 44 includes grooves 110, 112 therein for receiving electrodes from the battery cells 16, 18 therethrough.

The bottom wall 46 extends between the side walls 40, 42 at a second end of the rectangular ring-shaped panel member 12. The bottom wall 46 includes a plate portion 130, a riser portion 132 and a coupling member 136. The riser portion 132 is coupled to the plate portion 130 and extends outwardly from the plate portion 130. The coupling member 136 is coupled to the riser portion 132 and extends in the same direction as the riser portion 132 away from the plate portion 130. The coupling member 136 is configured to engage a ledge portion 264 (shown in FIG. 10) of the panel member 14 to hold the panel members 12, 14 together. The coupling member 136 has a substantially similar configuration as the coupling member 68.

Figure 9:
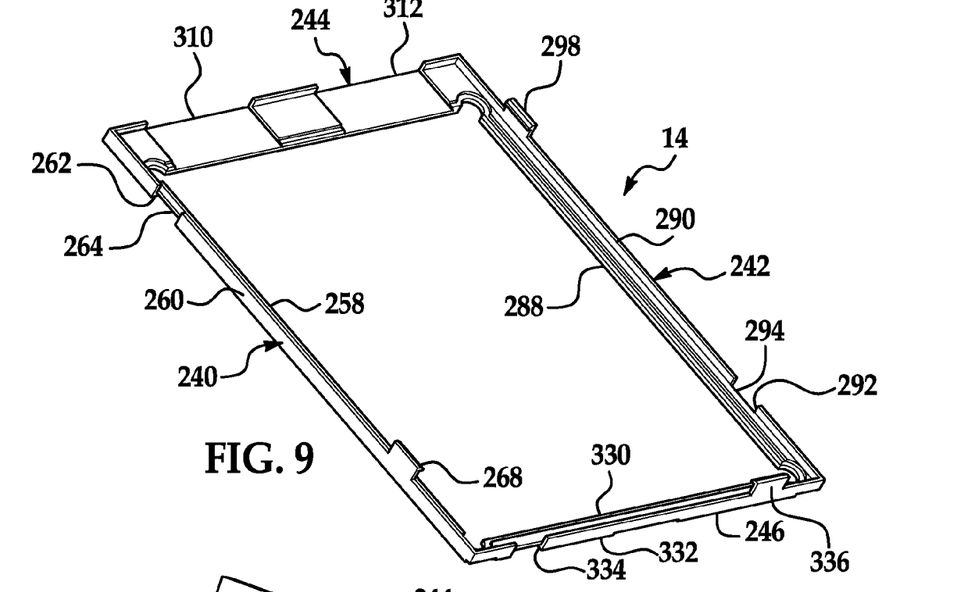
FIG. 9 is a schematic of a second rectangular ring-shaped panel member utilized in the battery cell assembly of FIG. 1.
Figure 10:
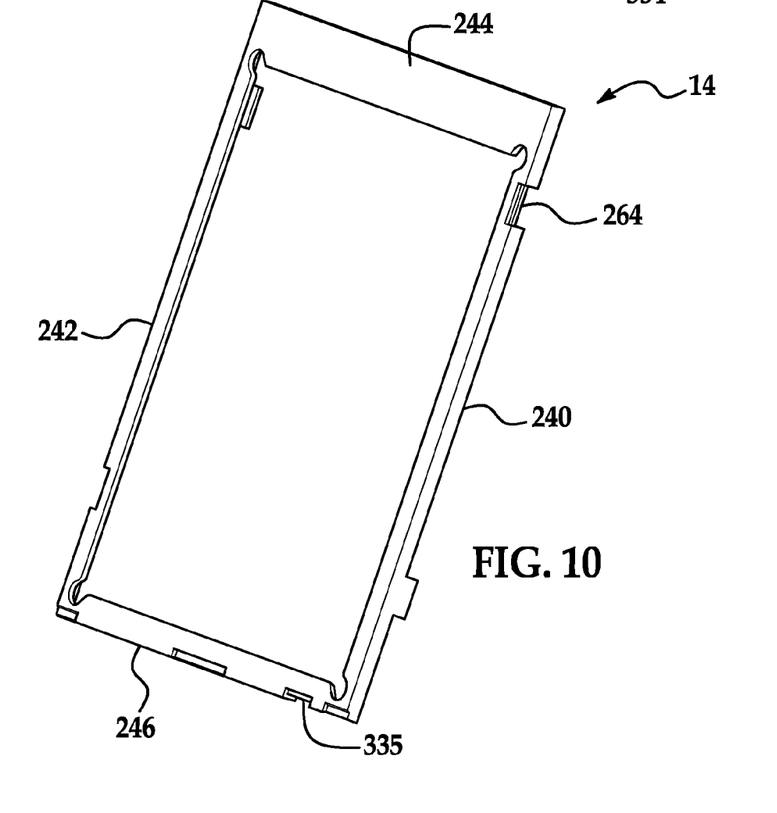
FIG. 10 is another schematic of the second rectangular ring-shaped panel member of FIG. 9.
Figure 11:
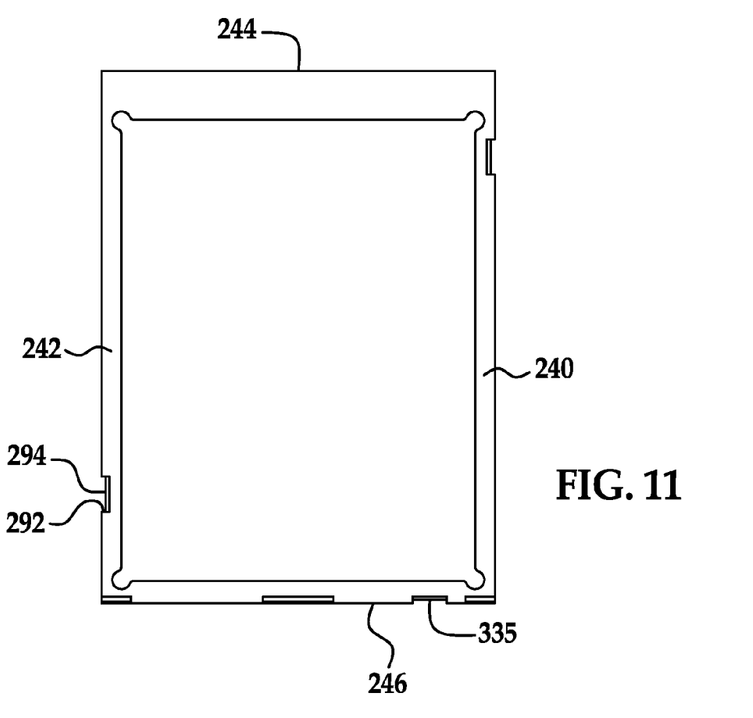
FIG. 11 is a schematic of a first side of the second rectangular ring-shaped panel member of FIG. 9.

Referring to FIGS. 9-11, the rectangular ring-shaped panel member 12 will now be explained. The panel member 12 includes side walls 240, 242, a top wall 244, and a bottom wall 246. In one exemplary embodiment, the panel member 14 is constructed from plastic. Of course other materials such as ceramics for example are contemplated. The side walls 240, 242 are disposed substantially parallel to one another and are disposed a predetermined distance apart from one another. Further, the side walls 240, 242 are disposed between the top wall 244 and the bottom wall 246.

The side wall 240 includes a plate portion 258, a riser portion 260 and a coupling member 268. The riser portion 260 is coupled to the plate portion 258 and extends outwardly from the plate portion 258. The coupling member 268 is coupled to the riser portion 260 and extends in the same direction as the riser portion 260 away from the plate portion 58. The coupling member 268 is configured to engage a ledge portion 94 (shown in FIG. 7) of the panel member 12 to hold the panel members 12, 14 together. The coupling member 268 has a substantially similar configuration as the coupling member 68 (shown in FIG. 3).

The side wall 240 further includes a groove 262 extending therein that defines a ledge portion 264. The ledge portion 264 is configured to engage the coupling member 98 (shown in FIG. 2) of the side wall 42 of the panel member 12 to hold the panel members 12, 14 together.

The side wall 242 includes a plate portion 288, a riser portion 290 and a coupling member 298. The riser portion 290 is coupled to the plate portion 288 and extends outwardly from the plate portion 288. The coupling member 298 is coupled to the riser portion 290 and extends in the same direction as the riser portion 290 away from the plate portion 298. The coupling member 298 is configured to engage the ledge portion 64 (shown in FIG. 7) of the panel member 12 to hold the panel members 12, 14 together. The coupling member 298 has a substantially similar configuration as the coupling member 68 (shown in FIG. 3).

Referring to FIGS. 2 and 11, the side wall 242 further includes a groove 292 extending therein that defines a ledge portion 294. The ledge portion 294 is configured to engage the coupling member 68 (shown in FIG. 2) of the side wall 40 of the panel member 12 to hold the panel members 12, 14 together.

The top wall 244 extends between the side walls 240, 242 at a first end of the panel member 14. The top wall 244 includes grooves 310, 312 therein for receiving electrodes from the battery cells 16, 18 therethrough.

The bottom wall 246 extends between the side walls 240, 242 at a second end of the panel member 14. The bottom wall 246 includes a plate portion 330, a riser portion 332 and a coupling member 336. The riser portion 332 is coupled to the plate portion 330 and extends outwardly from the plate portion 330. The coupling member 336 is coupled to the riser portion 332 and extends in the same direction as the riser portion 332 away from the plate portion 330. The coupling member 336 is configured to engage the ledge portion 135 (shown in FIGS. 6 and 7) of the panel member 12 to hold the panel members 12, 14 together. The coupling member 336 has a substantially similar configuration as the coupling member 68.

Figure 12:
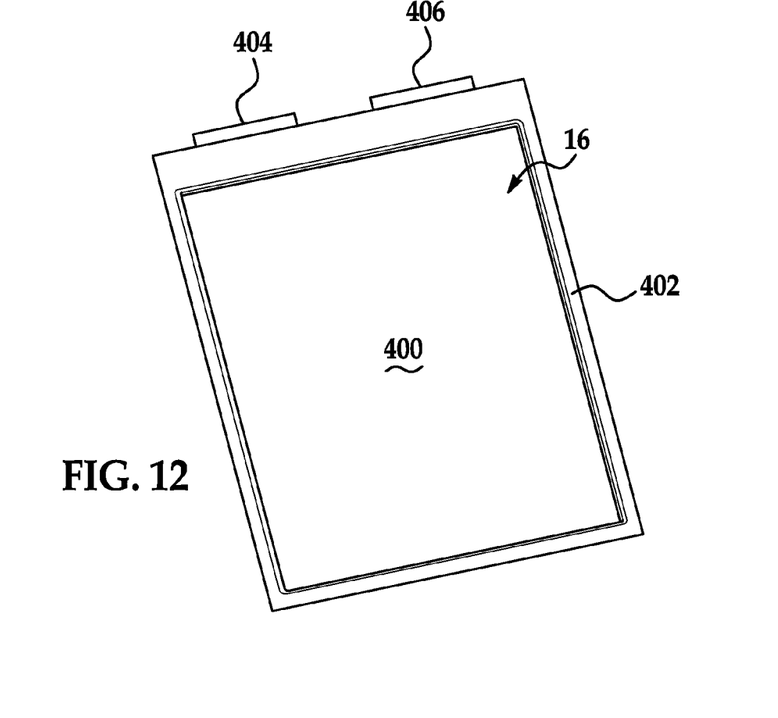
FIG. 12 is a schematic of a battery cell utilized in the battery cell assembly of FIG. 1.

Referring to FIGS. 12 and 13, the battery cells 16, 18 are provided to generate a voltage. The battery cell 16 includes a body portion 400, a peripheral lip portion 402, and electrodes 404, 406. The body portion 400 includes a cell portion that generates a voltage therein. The peripheral lip portion 402 extends around a periphery of the body portion 400. The electrodes 404, 406 are electrically coupled to the cell portion in the body portion 400.

The battery cell 18 includes a body portion 420, a peripheral lip portion 422, and electrodes 424, 426. The body portion 420 includes a cell portion that generates a voltage therein. The peripheral lip portion 422 extends around a periphery of the body portion 420. The electrodes 424, 426 are electrically coupled to the cell portion in the body portion 400.

Figure 15:
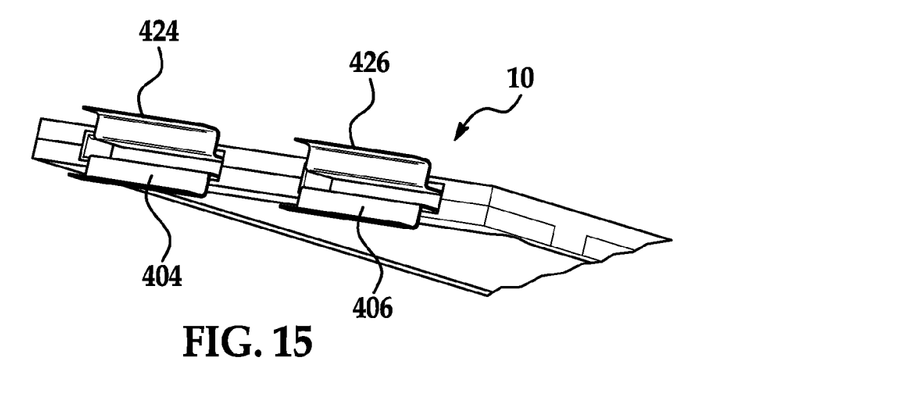
FIG. 15 is a schematic of a top portion of the battery cell assembly of FIG. 1.

Referring to FIG. 15, the electrodes 404, 406 from the battery cells 16 extend through apertures in the first end of the battery cell assembly 10. Further, the electrodes 424, 426 of the battery cell 18 extends outwardly through the apertures in the first end of the battery cell assembly 10.

Figure 14:
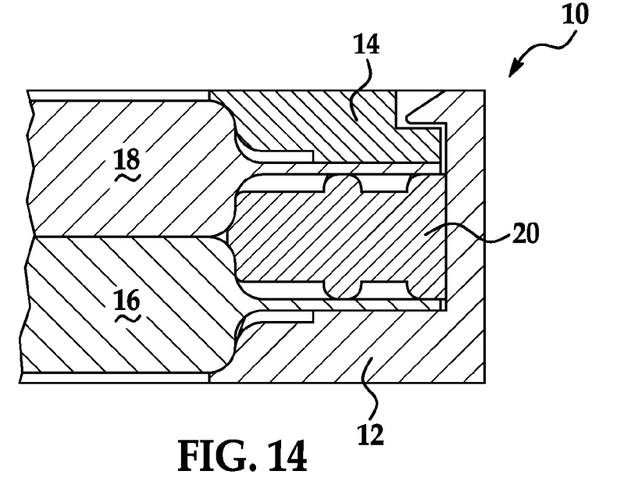
FIG. 14 is another cross-sectional schematic of a portion of the battery cell assembly of FIG. 1.

Referring to FIGS. 13 and 14, the battery cells 16, 18 are disposed between the rectangular ring-shaped panel members 12, 14. Further, the panel members 12, 14 are coupled together to fixedly hold the battery cells 16, 18 therebetween. Further, a gasket 20 is disposed between the peripheral lip portions of the battery cells 16, 18 to support the peripheral lip portions within the battery cell assembly 10.

Figure 16:
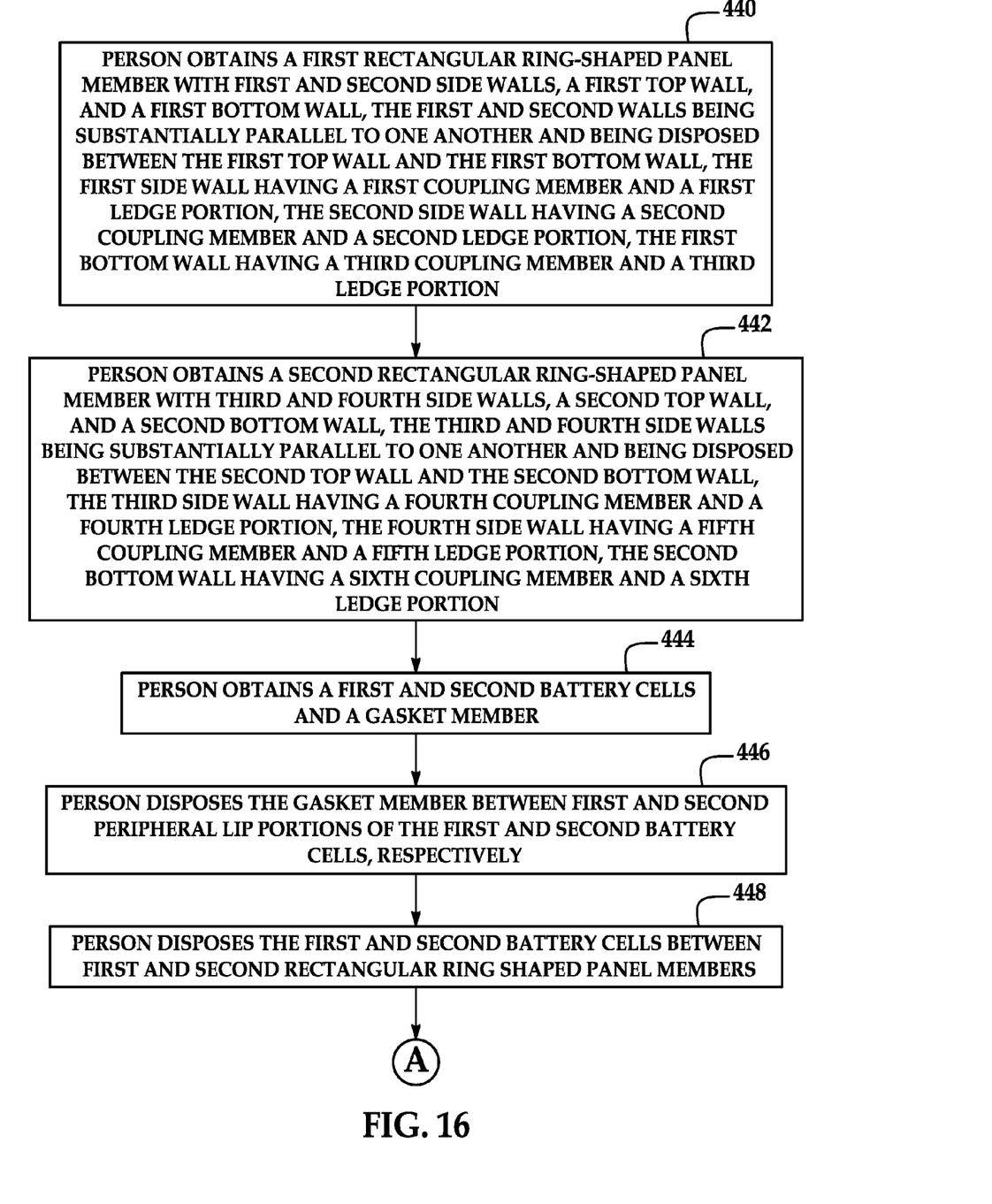
FIGS. 16-17 are flowcharts of a method for assembling the battery cell assembly of FIG. 1.
Figure 17:
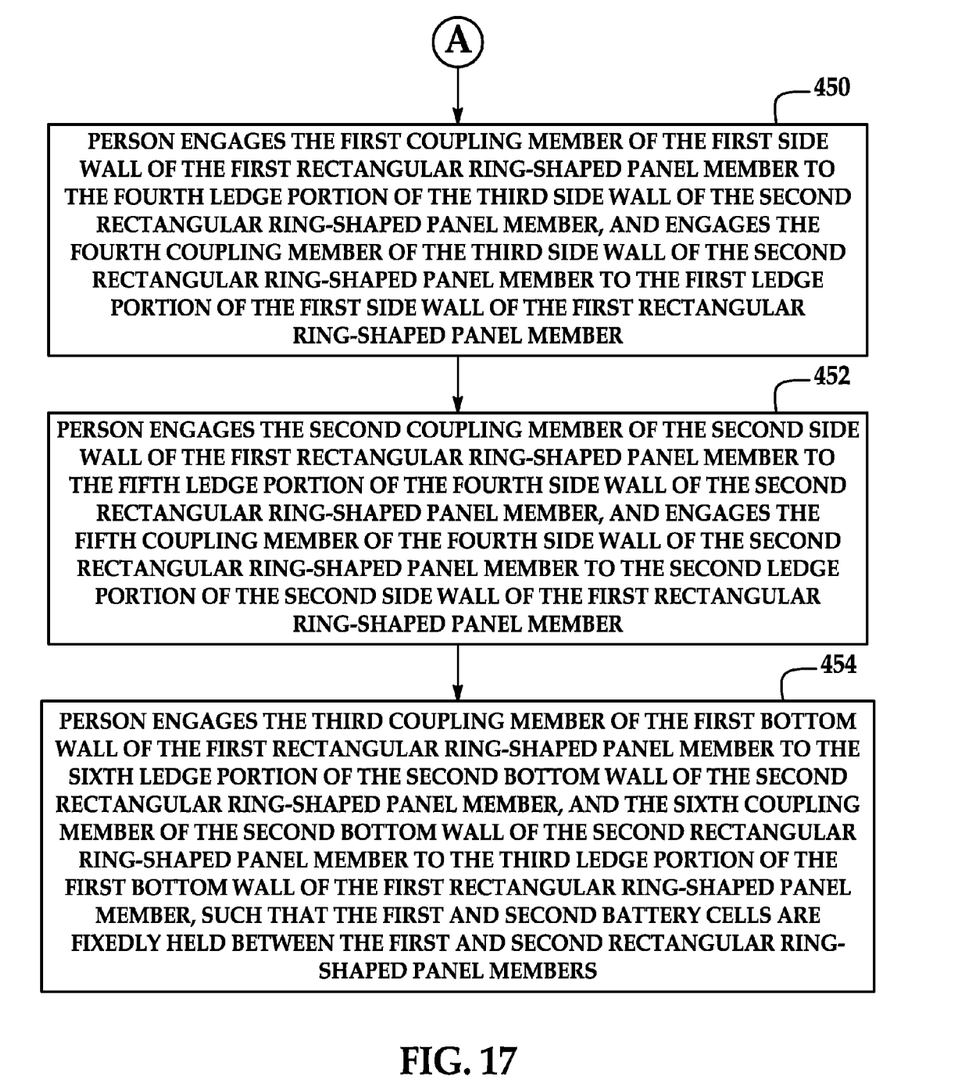

Referring to FIGS. 16 and 17, a flowchart of a method for assembling the battery cell assembly 10 in accordance with another exemplary embodiment will now be explained.

At step 440, a person obtains the rectangular ring-shaped panel member 12 with side walls 40, 42, the top wall 44, and the bottom wall 46. The side walls 40, 42 are substantially parallel to one another and being disposed between the top wall 44 and the bottom wall 46. The side wall 40 has the coupling member 68 and the ledge portion 64. The side wall 42 has the coupling member 98 and the ledge portion 94, and the bottom wall 46 has the coupling member 136 and the ledge portion 135.

At step 442, the person obtains the rectangular ring-shaped panel member 14 with side walls 242, 240, the top wall 244, and the bottom wall 246. The side walls 242, 240 are substantially parallel to one another and are disposed between the top wall 244 and the bottom wall 246. The side wall 242 has a coupling member 298 and the ledge portion 294. The side wall 240 has the coupling member 268 and the ledge portion 264, and the bottom wall 246 has the coupling member 336 and the ledge portion 335.

At step 444, the person obtains battery cells 16, 18 and the gasket member 20.

At step 446, the person disposes the gasket member 20 between peripheral lip portions 402, 422 of the battery cells 16, 18, respectively.

At step 448, the person disposes the battery cells 16, 18 between the panel members 12, 14.

At step 450, the person engages the coupling member 68 of the side wall 40 of the panel member 12 to the ledge portion 294 of the side wall 242 of the panel member 14, and engages the coupling member 298 of the side wall 242 of the panel member 14 to the ledge portion 64 of the side wall 40 of the panel member 12.

At step 452, the person engages the coupling member 98 of the side wall 42 of the panel member 12 to the ledge portion 264 of the side wall 240 of the panel member 14, and engages the coupling member 268 of the side wall 240 of the panel member 14 to the ledge portion 94 of the side wall 42 of the panel member 12.

At step 454, the person engages the coupling member 136 of the bottom wall 46 of the panel member 12 to the ledge portion 335 of the bottom wall 246 of the panel member 14, and the coupling member 336 of the bottom wall 246 of the panel member 14 to the ledge portion 135 of the bottom wall 46 of the panel member 12, such that the battery cells 16, 18 are fixedly held between the panel members 12, 14.

The battery cell assembly and the method for assembling the battery cell assembly provide a substantial advantage over other batteries and methods. In particular, the battery cell assembly and method provide a technical effect of utilizing panel members that can be easily coupled together to hold at least one battery cell therebetween.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:

1. A battery cell assembly, comprising:
    a first rectangular ring-shaped panel member having first and second side walls, a first top wall, and a first bottom wall, the first and second side walls being substantially parallel to one another and being disposed between the first top wall and the first bottom wall, the first side wall having a first coupling member, the second side wall having a first ledge portion;
    a second rectangular ring-shaped panel member having third and fourth side walls, a second top wall, and a second bottom wall, the third and fourth side walls being substantially parallel to one another and being disposed between the second top wall and the second bottom wall, the third side wall having a second coupling member, the fourth side wall having a second ledge portion, such that the first coupling member of the first side wall of the first rectangular ring-shaped panel member engages the second ledge portion of the fourth side wall of the second rectangular ring-shaped panel member and the second coupling member of the third side wall of the second rectangular ring-shaped panel member engages the first ledge portion of the second side wall of the first rectangular ring-shaped panel member;
    a first battery cell having a first peripheral lip portion;
    a second battery cell having a second peripheral lip portion; and
    a gasket disposed between the first and second peripheral lips portions of the first and second battery cells, respectively, and contacting the first and second peripheral lip portions, the first and second battery cells and the gasket being
    fixedly held between the first and second rectangular ring-shaped panels.

2. The battery cell assembly of claim 1, wherein the first battery cell further includes a first body portion, and the first peripheral lip portion extending around a periphery of the first body portion, the first peripheral lip portion being disposed between the first and second rectangular ring-shaped panel members.

3. The battery cell assembly of claim 1, wherein the first rectangular ring-shaped panel member and the second rectangular ring-shaped panel member are constructed from plastic.

4. The battery cell assembly of claim 1, wherein the second side wall further has a third coupling member, the first side wall further having a third ledge portion, the fourth side wall further having a fourth coupling member, the third side wall further having a fourth ledge portion, such that the third coupling member of the second side wall of the first rectangular ring-shaped panel member engages the fourth ledge portion of the third side wall of the second rectangular ring-shaped panel member and the fourth coupling member of the fourth side wall of the second rectangular ring-shaped panel member engages the third ledge portion of the first side wall of the first rectangular ring-shaped panel member.

5. A method for assembling a battery cell assembly, the battery cell assembly having a first rectangular ring-shaped panel member with first and second side walls, a first top wall, and a first bottom wall, the first and second side walls being substantially parallel to one another and being disposed between the first top wall and the first bottom wall, the first side wall having a first coupling member, the second side wall having a first ledge portion, the battery cell assembly further having a second rectangular ring-shaped panel member with third and fourth side walls, a second top wall, and a second bottom wall, the third and fourth side walls being substantially parallel to one another and being disposed between the second top wall and the second bottom wall, the third side wall having a second coupling member, the fourth side wall having a second ledge portion, the method comprising:

disposing a gasket member between first and second peripheral lip portions of first and second battery cells, respectively;

disposing the first and second battery cells and the gasket between the first and second rectangular ring-shaped panel members;

engaging the first coupling member of the first side wall of the first rectangular ring-shaped panel member to the second ledge portion of the fourth side wall of the second rectangular ring-shaped panel member; and engaging the second coupling member of the third side wall of the second rectangular ring-shaped panel member to the first ledge portion of the second side wall of the first rectangular ring-shaped panel member, such that the first and second battery cells and the gasket are fixedly held between the first and second rectangular ring-shaped panel members.

* * * * *